(12) United States Patent
Bishop

(10) Patent No.: US 6,664,888 B1
(45) Date of Patent: *Dec. 16, 2003

(54) METHOD AND APPARATUS FOR ENABLING AND DISABLING CERTAIN FUNCTIONS OF AN AUTOMOBILE

(75) Inventor: Ronald D. Bishop, Trabuco Canyon, CA (US)

(73) Assignee: Vetronix Telematics LLC, Santa Barbara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/212,811

(22) Filed: Dec. 16, 1998

Related U.S. Application Data

(60) Provisional application No. 60/069,726, filed on Dec. 16, 1997.

(51) Int. Cl.[7] .............................................. B60R 25/10
(52) U.S. Cl. .............................. 340/426.11; 340/425.5; 340/5.6; 340/539; 340/825.69; 340/825.72; 340/426.12; 307/10.1; 307/10.2; 307/10.3
(58) Field of Search ...................... 340/426.11, 426.12, 340/425.5, 539, 825.31–5.6, 825.69, 825.72; 307/10.1, 10.2, 10.3

(56) References Cited

U.S. PATENT DOCUMENTS

| | | | | |
|---|---|---|---|---|
| 4,990,890 A | * | 2/1991 | Newby | 340/539 |
| 5,276,728 A | | 1/1994 | Pagliaroi et al. | |
| 5,307,048 A | | 4/1994 | Sonders | |
| 5,432,495 A | | 7/1995 | Tompkins | |
| 5,448,218 A | | 9/1995 | Espinosa | |
| 5,513,244 A | * | 4/1996 | Joao et al. | 379/58 |
| 5,600,299 A | | 2/1997 | Tomkins | |
| 5,606,307 A | | 2/1997 | Kuan | |
| 5,638,044 A | | 6/1997 | Chua | |
| 5,652,564 A | | 7/1997 | Winbush | |
| 5,939,975 A | | 8/1999 | Tsuria et al. | |
| 5,986,543 A | | 11/1999 | Johnson | |
| 6,091,340 A | * | 7/2000 | Lee et al. | 340/5.6 |
| 6,232,884 B1 | * | 5/2001 | Gabbard | 340/825.72 |

FOREIGN PATENT DOCUMENTS

| | | |
|---|---|---|
| DE | 0449471 A2 * | 10/1991 |
| EP | 0449 471 A2 | 10/1991 |
| GB | 228 4018 A | 5/1995 |
| GB | 2284018 A * | 5/1995 |

* cited by examiner

*Primary Examiner*—Julie Lieu
(74) *Attorney, Agent, or Firm*—Luce, Forward, Hamilton & Scripps LLP

(57) ABSTRACT

An apparatus and method designed for use with a vehicle that remotely activates an audio warning device prior to disabling the ability for the driver to start the vehicle. The apparatus is installed in the vehicle and includes a special pager receiver that decodes paging messages sent from a paging transmitter site. The pager receiver is electrically connected to a controller which interprets the coded message. An in-vehicle digital radio transmitter then sends a wireless transmission to digital radio receivers installed in the vehicle. Each digital radio receiver is incorporated in a package that includes an electrical connection to an electromagnetic relay. The relay is plugged into the electrical circuits of the vehicle which activate certain devices or functions, such as the starter motor, ignition system, power door locks, headlamps, horn, and other system that may use electrical relays. The digital radio receivers decode the transmissions from the in-vehicle transmitter and decide whether to open or close their respective relays, thus disabling or enabling certain devices or functions in the vehicle. The invention finds applicability for use by lender institutions in order to disable vehicles when the owner has not kept his account current.

27 Claims, 7 Drawing Sheets

METHOD AND APPARATUS FOR ENABLING AND DISABLING CERTAIN FUNCTIONS OF AN AUTOMOBILE

This application claims the benefit of provisional U.S. application Ser. No. 60/069,726, filed on Dec. 16, 1997, the contents of which are hereby incorporated by reference.

The present invention is directed to a method and apparatus for enabling and/or disabling certain devices or functions in a vehicle.

BACKGROUND OF THE INVENTION

Remote control devices which disable certain functions of automobiles are in the prior art. These devices are integrated into car alarms and carjacking/theft deterrent systems, and allow a person whose car has been stolen to call the stolen automobile using a telephone or, in some cases, a pager in order to inform the theft deterrent system that the automobile has been stolen. The theft deterrent system will then disable the automobile, such as by stopping the motor. In these prior art systems, a hard-wired network of wires connects an antenna to a controller, and the controller to a solenoid or other switch which, when activated or deactivated as the case may be, causes one of the automobile's functions to be disabled. As a typical example, the theft deterrent system of the prior art will cause the automobile's engine to stop running. In these prior art systems, the focus is on stopping the automobile as soon as possible so that a thief will not go far and the automobile will be recovered swiftly.

Other prior art systems use cellular phone technology to transmit a signal to open locked doors, as a service to customers who have locked their keys in the automobile.

SUMMARY OF THE INVENTION

In marked contrast to the prior art, one object of the present invention is to provide a method and apparatus for communicating in a wireless manner between specific electrical components in a vehicle in order to disable and/or enable certain functions in the vehicle.

Another object of the present invention is to provide a method and apparatus which permits a loan agency, credit agency, rental agency, law enforcement agency, or any other agency which wishes to have some control over the operation of a vehicle, to disable and perhaps re-enable the starter or other function in a vehicle.

Still another object of the present invention is to provide an apparatus which can enable and disable certain functions of an automobile, but which is virtually impossible to detect or locate.

These and other objects of the present invention are achieved by an apparatus for disabling at least one function in a vehicle, said apparatus being mounted in the vehicle and comprising a receiver for receiving a remote signal; a controller, connected to said receiver, for determining whether said remote signal includes a predetermined signal and, if so, for instructing a transmission of a command to disable a function in the vehicle; a wireless transmitter, connected to said controller, for transmitting the command; and at least one switching device, said switching device including a switch for disabling the function of the vehicle, and a second receiver, said second receiver for receiving the command transmitted by said wireless transmitter and for controlling said switch in order to disable the function.

One of more of the objects of the present invention are also achieved by an apparatus for enabling at least one function in a vehicle, said apparatus being mounted in the vehicle and comprising a receiver for receiving a remote signal; a controller, connected to said receiver, for determining whether said remote signal includes a predetermined signal and, if so, for instructing a transmission of a command to enable or disable a function in the vehicle; a wireless transmitter, connected to said controller, for transmitting the predetermined command; and at least one switching device, said switching device including a switch for enabling the function of the vehicle, and a second receiver, said second receiver for receiving the command transmitted by said wireless transmitter and for controlling said switch in order to enable the function.

One of more of the objects of the present invention are also achieved by a method for disabling at least one function in a vehicle, comprising receiving a remote signal at the vehicle; determining whether said remote signal includes a predetermined signal and, if so, transmitting a wireless command from the vehicle to disable a function in the vehicle; receiving said wireless command in the vehicle; and disabling the function in response to receipt of said wireless command.

One of more of the objects of the present invention are also achieved by a method for enabling and/or disabling at least one function in a vehicle, comprising receiving a remote signal at the vehicle; determining whether said remote signal includes a predetermined signal and, if so, transmitting a wireless command from the vehicle to enable or disable a function in the vehicle; receiving said wireless command in the vehicle; and enabling or disabling the function in response to receipt of said wireless command.

Further scope of applicability of the present invention will become apparent from a review of the detailed description and accompanying drawings. It should be understood that the description and examples, while indicating preferred embodiments of the present invention, are not intended to limit the breadth of the invention since various changes and modifications within the spirit and scope of the invention will become apparent to those skilled in the art.

BRIEF DESCRIPTION OF THE DRAWINGS

The present invention will become more fully understood from the detailed description given below, together with the accompanying drawings which are given by way of illustration only, and thus are not to be construed as limiting the scope of the present invention. In the drawings.

DETAILED DESCRIPTION OF THE PREFERRED EMBODIMENTS

Figure 1:
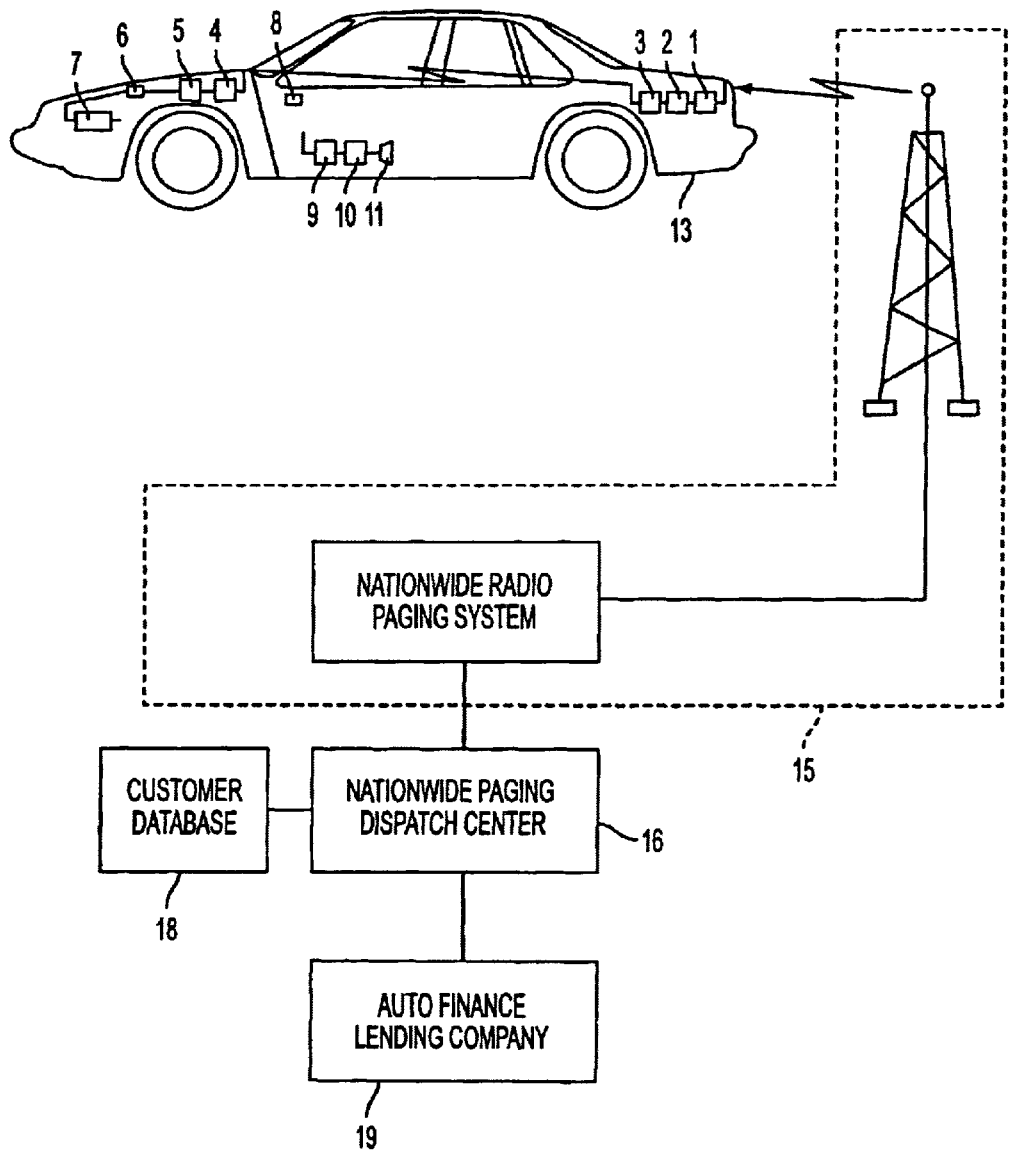
FIG. 1 shows a general overview of an embodiment of the present invention.

Referring initially to FIG. 1, which shows a general overview of a system which employs the present invention, the system includes a communication station having a main transmitter 15 that is at a fixed location. The main transmitter 15 is able to transmit a digital signal over a radio frequency to a main receiver 1 which is maintained on board automobile 13. Preferably, the main transmitter 15 and the main receiver 1 are pager-type transmitters and receivers such that the radio signal is simultaneously transmitted from a plurality of transmitters 15 throughout the geographical territory where the automobile may be located. In this manner, regardless of the location of the automobile, the transmitted signal can be received by the main receiver 1 on board the automobile. Preferably, both the transmitter and receiver are digital type radio equipment to allow the use of encoded digital signals. In this manner the security and reliability of the system can be maximized.

Although FIG. 1 illustrates an automobile 13, it should be understood that the present invention can be used with any type of vehicle, including land, sea, and air vehicles. Moreover, because the physical manifestation of the transmitter 15 is not critical to the operation of the present invention, satellite or other non-stationary communication stations can also be used.

In FIG. 1, a controller 2 is shown installed in the trunk of automobile 13. A controller 2, which is preferably a micrologic controller such as a microprocessor, interprets the coded message received by the main receiver 1. The controller 2 is in electrical communication with the main receiver 1. Also connected to the main receiver 1 and the controller 2 is a wireless digital radio transmitter 3 capable of transmitting a series of predetermined digital codes. This digital radio transmitter 3 is capable of transmitting digital codes to a plurality of digital receivers 4, 9 installed in the automobile. Preferably, a distinct encoded signal is used for each relay or system to be enabled or disabled. By sending one or more encoded signals, operation of one or more systems can be controlled. As those skilled in the art will appreciate, through the use of encoded digital signals transmitted from the transmitter 3, a secure and reliable system is provided which, through the use of a single main receiver 1, can operate a plurality of relays and thus a plurality of functions in the automobile.

Typically, a vehicle is provided with manual switches which the user controls in order to activate an accessory or other vehicle function. For example, a button might activate the door locks, and a key might activate the starter motor. The circuits for these accessories are relay-based, meaning that a relay is used to isolate the manual switch from the high power loop between the vehicle battery (or other power source) and the accessory itself This avoids the possibility of unwanted power entering the manual switch and perhaps giving a shock to the user. These accessories and features may include, without limitation, the relay 5 for the starter motor 7, and relays for the ignition system, power door locks, trunk release, headlamps, automobile horn and any other relay-based electrical system within the automobile 13. An example would be a manual switch such as a key to starting the vehicle's engine.

The slave units according to the present invention and as described later herein, are used in conjunction with the pre-existing relay devices mounted within the vehicle. The slave units include respective receivers, controllers, and their own internal relays or switches which operate in order to enable or disable a vehicle function with which the slave unit is associated. In effect, the relay or switch of the inventive slave unit will override the open/closed state of the vehicle's pre-existing relay.

Also shown in FIG. 1 is an ignition switch 8. A slave relay 5 according to the present invention is connected to the digital receiver 4 and lies in a circuit between the ignition switch 8 and a starter solenoid 6. Solenoid 6 is connected to starter motor 7. As will become apparent upon further description, these components can be used to prevent the vehicle from being started.

Many digital receivers 4 may be used in the present invention, each embodied as a slave unit having its own electrical relay or switch. The slave units may include, without limitation, the relay 5 for the starter motor 7, and relays for the ignition system, power door locks, trunk release, headlamps, automobile horn and any other relay-based electrical system within the automobile 13. Again, the relay or switch in the slave unit will be in addition to the pre-existing relay of the relay-based vehicle function. As seen in FIG. 2(*a*), the slave relay 203 is connected between the manual switch 213, such as a key lock for ignition switch 8, and the vehicle accessory or function 205, such as starter motor 7 (FIG. 1) which performs the function of starting the vehicle's engine.

The vehicle accessory 205 is connected in a high power loop 207 to a power source 211 and a pre-existing relay 209. A manual switch 213 is also connected to the pre-existing relay 209 in a low power loop 215. Assuming that the pre-existing relay 109 is normally open, the user may actuate the manual switch 213 in order to close the pre-existing relay 209. Once the pre-existing relay is closed, the high power loop 207 is closed thereby supplying power to vehicle accesory 205. Thus the manual switch activates the vehicle accessory. However, the slave unit according to the present invention is also inserted into the high power loop 207 thereby adding another relay or electronic switch to the loop. Assuming that the slave unit relay 203 is normally closed, the vehicle accessory is activated as just described. But if the receiver 201 detects a command to open the slave unit relay 203 then the relay 203 is opened thereby disabling the high power loop 207 and thus the vehicle accessory 205. In other words, even if the user actuates the manual switch 213, the vehicle accessory 205 will be unable to activate because it will not receive any power. For example, if the slave unit relay 203 is in the power line for the vehicle's starter motor, then opening the relay 203 will disable the user from engaging the starter motor thereby preventing the vehicle's engine from starting.

As an alternative to the above, and depending on the vehicle accessory being controlled, it is possible to use a normally open switch for the slave unit relay 203.

The connection of the slave unit relay 203 to the vehicle power source 211 is omitted from FIG. 2(*a*) for simplicity. The receiver 201 contains appropriate circuitry such as a programmed microprocessor for interpreting commands transmitted from the master in-vehicle transmitter 3 and for opening the relay 203 when the relay 203 is identified in the command 202. In this manner, the present invention allows a digital paging signal to disable or enable certain features and accessories in the vehicle.

In FIG. 2(*b*), another embodiment of the present invention is shown. A slave unit having a receiver 219 and relay 217 is connected in the low power loop 215 between the manual switch 213 and the power source 211, instead of in the high power loop 207 which includes the power source 211, the vehicle accessory 205 and the pre-existing relay 209. As with FIG. 2(*a*), the connection of the relay 217 to the vehicle's battery or other power source is omitted for simplicity. In this embodiment, the ability of the manual switch 213 to close the normally open pre-existing relay 209 is disabled when the normally closed slave unit relay 217 is opened. Opening the slave unit relay 217 opens the low power loop 215, thereby removing power from the pre-existing relay 209 rendering it incapable of closing.

Figure 2A:
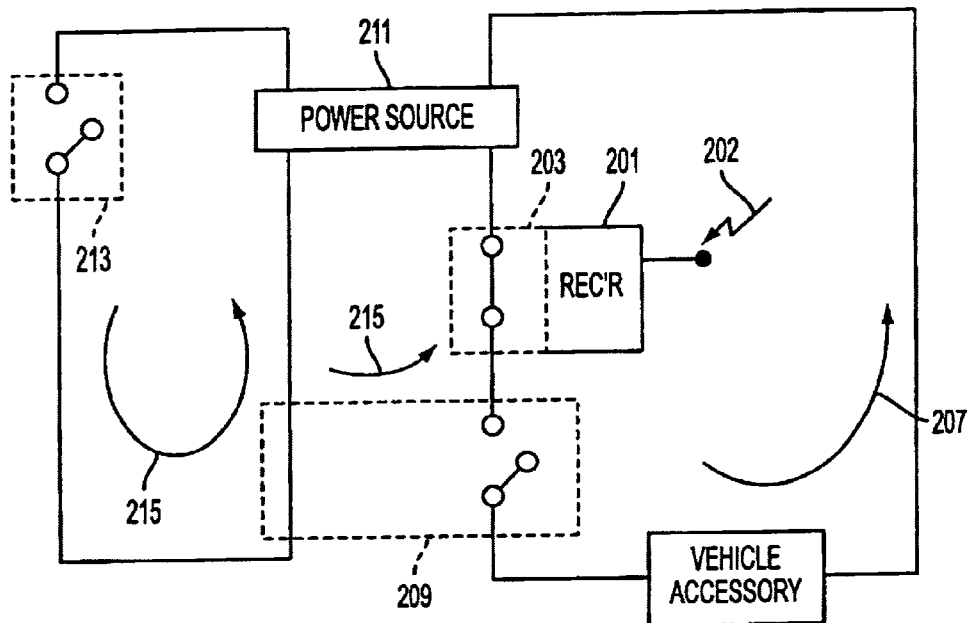
FIGS. 2(a) through 2(d) are circuit diagrams showing how the slave relays according to the present invention are connected to control vehicle functions.

In FIG. 2(a), the slave unit relay 203 must be able to tolerate whatever peak power may exist within the high power loop 207. Preferably, the relay 203 is the same type of electromagnetic relay that is used for the pre-existing relay 209. However, it is more preferable from the point of view of cost to design one standard slave unit relay 203 which can be used in any of the high power loops present in a plurality of vehicle types. Although a high power relay 203 can be used in the embodiment of FIG. 2(b), it is also possible to use a weaker relay as the slave unit relay 217 because it is used in a lower power loop 215. The weaker slave unit relay 217 can be of the electromagnetic type but it can also be a simply electronic switch. It can be as simple as a two-input AND gate having the power source on one input line, an ON/OFF signal on the other input line, and the output leading to the manual switch. It is within the level of skill for the artisan to use other switches for the relay 217 as well.

Figure 2B:
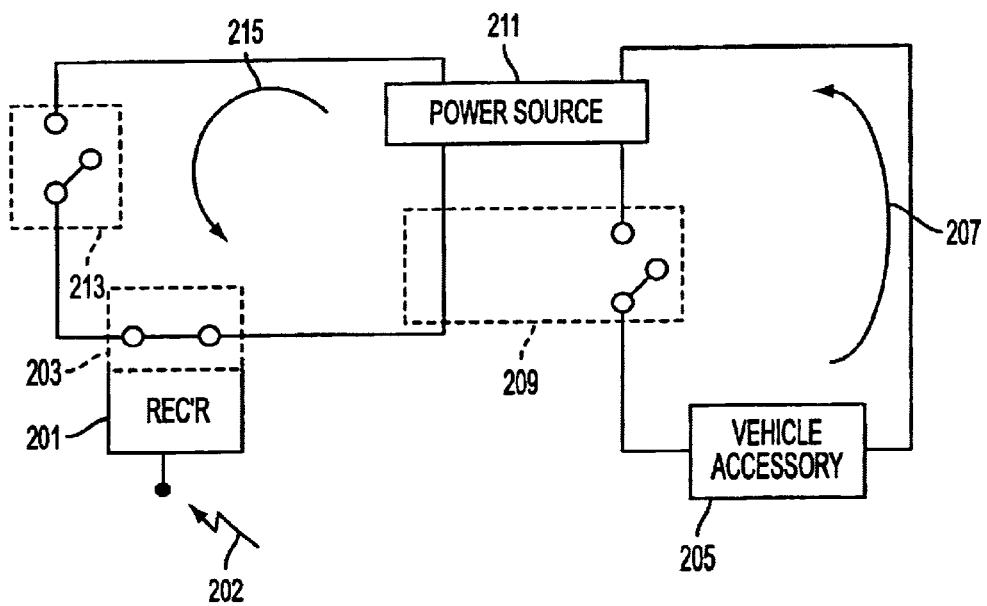

The embodiments of FIGS. 2(a) and 2(b) can be combined in order to provide a redundant way to disable or enable the vehicle accessory.

Using the present invention, it is possible for the transmitter system 15 to send an instruction identifying a particular vehicle and a particular function to be disabled or enabled. The main receiver 1 receives and interprets the instruction, and if the instruction identifies the vehicle 13, then the in-vehicle transmitter 3 sends a wireless command to the slave receivers which control the relay-based functions in the vehicle. Only those receivers which are identified in and recognize the wireless command will open or close their relay(s), as the case may be, in order to disable or enable the vehicle function which is the target of the command.

Figure 2C:
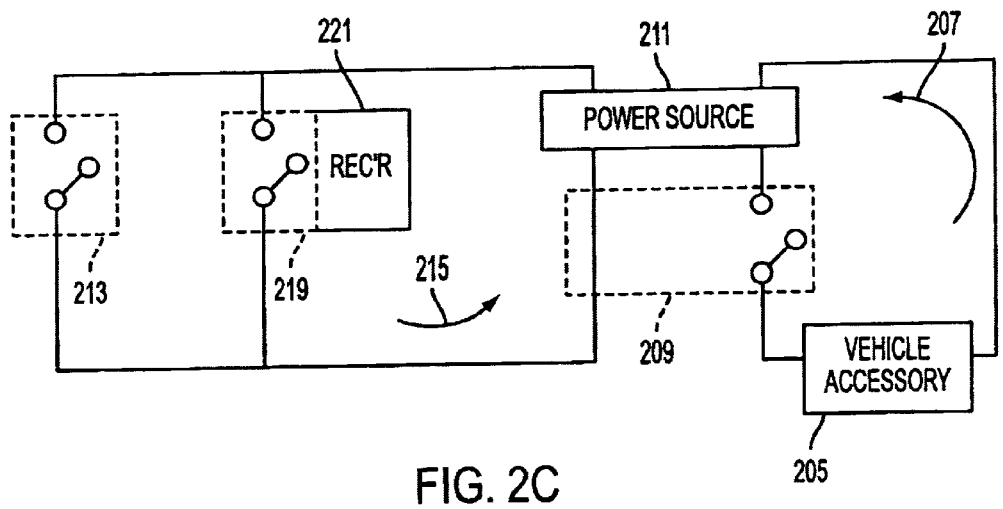

FIG. 2(c) illustrates yet another embodiment of the present invention. The slave relay 219 is connected to the power source 211 in parallel with the manual switch 213. The relay 219 is a normally open switch which, in its open state, allows the manual switch 213 to control the operation of the vehicle accessory. Upon receipt of the appropriate command by the receiver 221, the slave relay 219 closes thereby supplying power to the pre-existing relay 209 and forcing the relay 209 to close. By doing so, the slave relay 219 activates the vehicle accessory 205 regardless of the state of the manual switch 213. This embodiment may be useful with accessories such as vehicle lights, horn, or door locks in order to force them to activate. The receiver 221 can also be programmed to periodically open and close the slave relay 219 in order to flash the vehicles lights, flash the horn, etc. As with the other embodiments, it is possible to substitute a normally closed relay for the normally open slave relay 219 in order to obtain opposite enabled/disabled states.

Figure 2D:
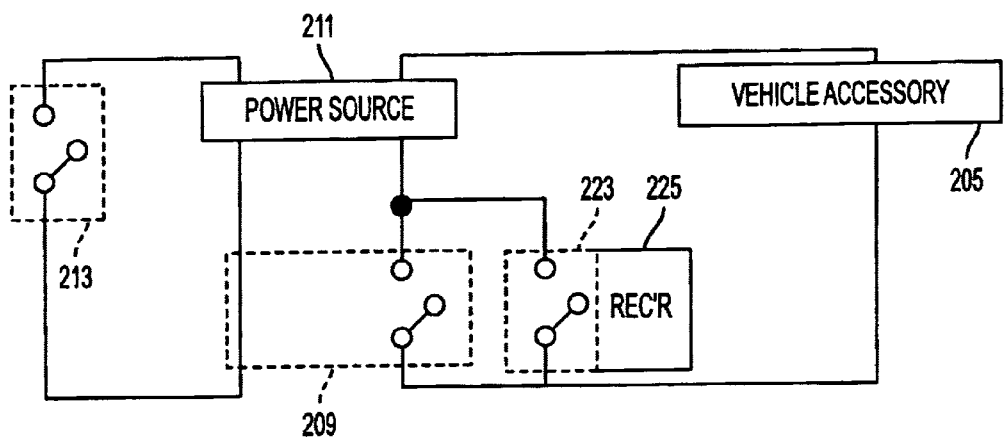

FIG. 2(d) shows yet another embodiment of the present invention. The slave unit relay 223 is connected in parallel with the pre-existing relay 209. The slave unit relay 223 is a normally open switch which, in its open state, allows the pre-existing relay 209 to control the operation of the vehicle accessory 205. Upon receipt of the appropriate command by the receiver 225, the slave unit relay 223 closes thereby supplying power to the vehicle accessory 205 and forcing it to operate. By doing so, the slave unit relay 223 activates the vehicle accessory 205 regardless of the state of the manual switch 213 and/or the pre-existing relay 209. This embodiment may be used in situations such as those described in relation to FIG. 2(c). In FIG. 2(d), however, the slave relay 223 may have to withstand higher power than slave relay 219 of FIG. 2(c) because the vehicle accessory 205 likely consumes more power than the coil of the pre-existing relay 209. As with the other embodiments, it is possible to substitute a normally closed relay for the normally open slave unit relay 223.

According to the present invention, pre-existing relays which are used in the vehicle are supplemented with "smart" relays whose open/closed state is controllable by the controller 2. If a command from the controller 2 instructs the slave relay 5 to be opened by the receiver 4, for example, then the user will be unable to operate the starter motor 7 via the manual switch (here, vehicle key) 8.

While the smart relays of the present invention are used primarily as supplements to pre-existing relays, those skilled in the art will appreciate that plural smart relays may be connected in parallel or in series in order to provide redundancy or to reduce system tampering or system disablement. The smart relays can also be used to control functions which are not traditionally controlled by relays. In addition, the circuitry according to the present invention can be such that one smart relay controls a plurality of vehicle functions.

The system according to the present invention also preferably includes the digital radio receiver 9 which is connected to a timer control 10 and to an audio warning unit 11. The audio warning unit 11 can be a piezoelectric buzzer, a loudspeaker, or any other device that makes an audible warning. In this manner, a warning signal can be transmitted from the main transmitter 15 to the main receiver 1, and the controller 2 can retransmit a warning command through the digital radio transmitter 3 to the digital receiver 9. Once received at receiver 9, the system initiates the process of providing an audible warning to the users of the automobile prior to, or at the same time as, enabling or disabling a particular function of the automobile. For example, prior to disabling the starter mechanism, the warning device can provide an audio warning to the occupants of the vehicle that the starter mechanism of the vehicle will be disabled unless the occupants perform certain actions. Preferably, the timer control 10 will provide a warning that is repeated over a predetermined period with predetermined intervals, such as 10 beeps on the hour and half-hour for 24 hours, so that the occupants will receive a plurality of prior warnings of the enablement or disablement of certain functions of the vehicle. At a later time, signals can be sent from the main transmitter 15 for enabling or disabling those functions. The warning system can include a visual warning in addition to or instead of the audio warning.

It should also be understood that the command transmitted by the controller 2 through the in-vehicle transmitter 3 may trigger only the warning system, or may trigger both the warning system and one or more of the appropriate slave relays. In this regard, the warning system's timer control 10 may be provided with a memory storing a plurality of different warnings. Upon interpreting the incoming command from the transmitter 3, the warning system will choose the proper one(s) of the stored warnings to sound and/or show to the users of the automobile. The warnings can sound like a recognizable buzz, a spoken instruction, etc. The visual warning can be a flashing light, a scrolling set of words, etc. Typically, the audio and visual warnings will use dedicated audio and visual warning devices, but use of the vehicle's pre-existing audio and/or visual devices is also possible.

Figure 3:
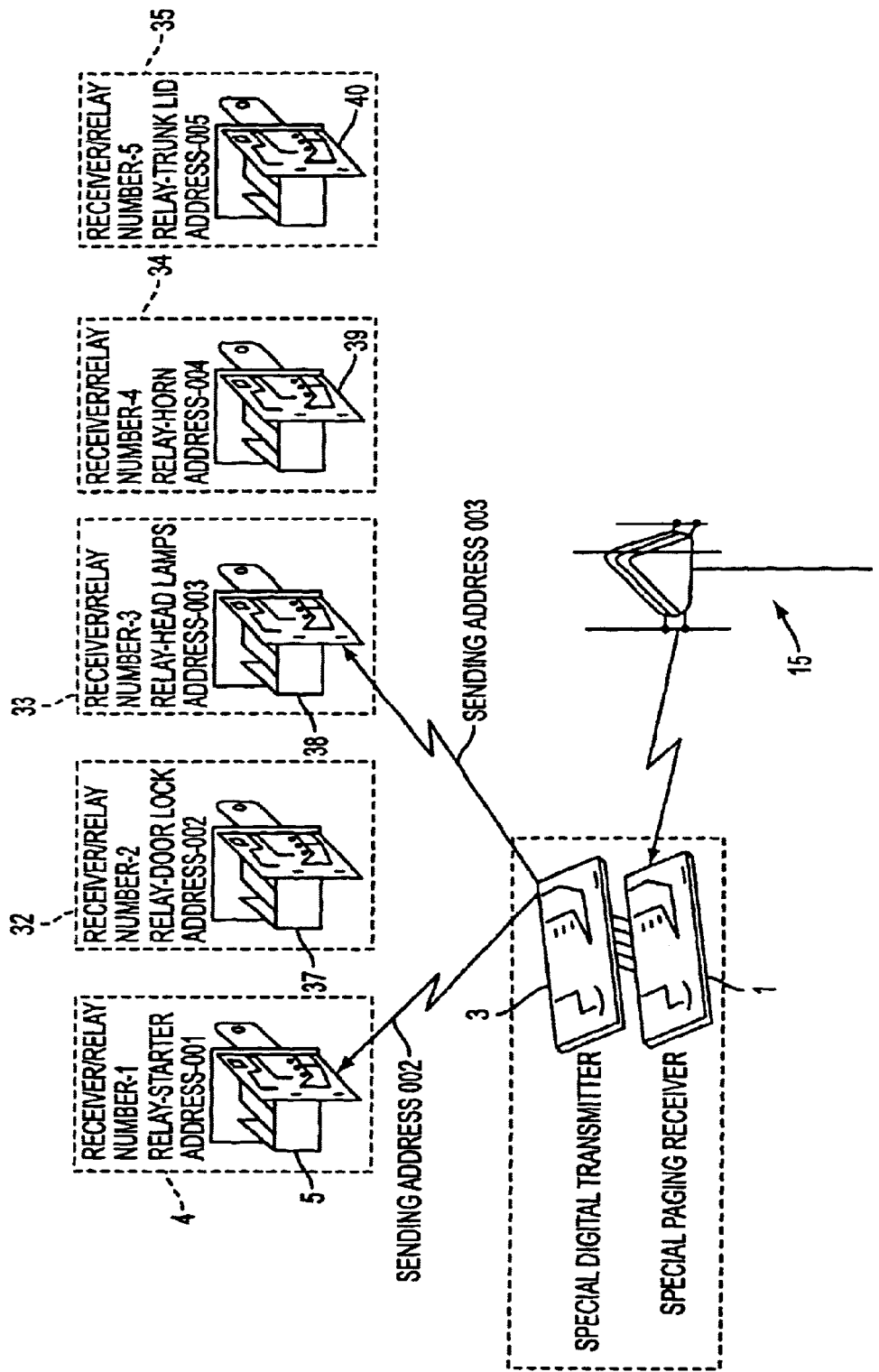
FIG. 3 shows a representation of the operation of an embodiment of the present invention.
Figure 4A:
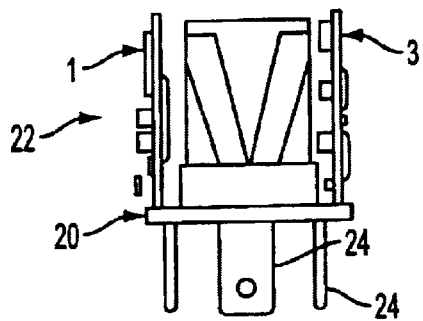
FIGS. 4(a) through 4(f) show different embodiments of the main and slave units according to the present invention.
Figure 4B:
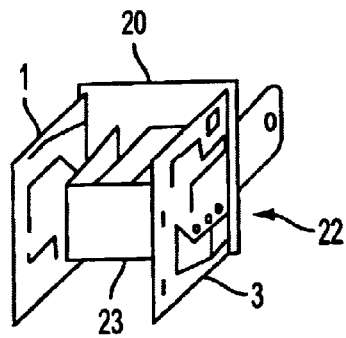
Figure 4C:
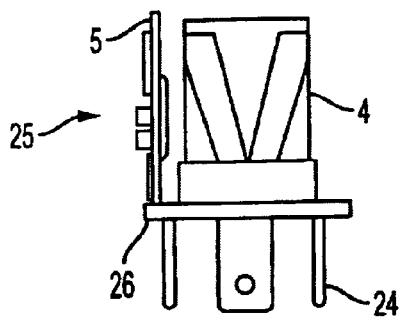
Figure 4D:
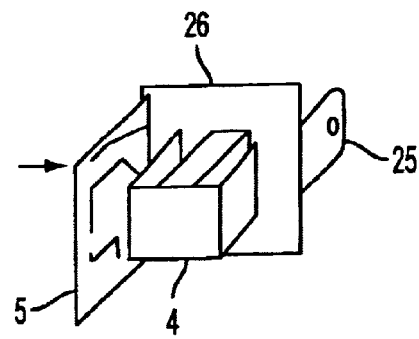
Figure 4E:
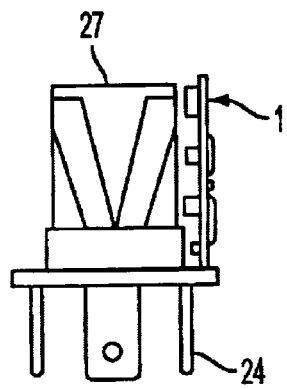
Figure 4F:
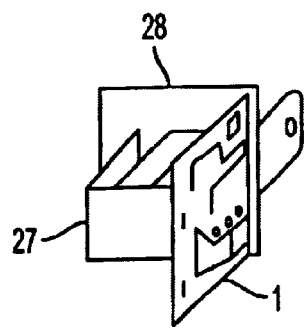

In FIG. 3, a series of slave relays 4, 32–35 according to the present invention are associated with respective functions in the vehicle. For example, relay 4 controls the starter motor; relay 32 controls the door locks; relay 33 controls the headlamps; relay 34 controls the horn; relay 35 controls the trunk lid. In the preferred embodiment, each relay 4, 32–35 will have a respective receiver 5, 37–40 and, a respective identifier or address. The warning system is not shown in FIG. 3, but preferably also has its own receiver and its own identifier or address. The receivers 5, 37–40 include appropriate circuitry for detecting and interpreting wireless signals. Such circuitry is well known to those skilled in the art, and therefore it will not be elaborated herein. Main receiver 1 is preferably a paging receiver compatible with digital transmissions to/from the main transmitter 15. The controller 2 (FIG. 1) can be formed as a separate component or, as shown in FIG. 3, it can be incorporated into either the in-vehicle receiver 1 or the in-vehicle digital radio transmitter 3. All three components 1, 2, 3 can also be integrated into one; this aspect of the invention is not critical.

In operation, the main transmitter 15 will transmit a signal such as a numeric code over the air to the in-vehicle receiver 1. The signal may be a 900 MHz radio signal for maximum range and clarity, and preferably includes a vehicle identifier which identifies the vehicle to which the signal is addressed, and an instruction to enable or disable a particular function or functions. The receiver 1 passes the signal to the controller 2 for interpretation. If the controller recognizes the signal as an instruction to enable and/or disable one or more functions in the vehicle, then the controller 2 transmits a command through the in-vehicle transmitter 3 over the air to the digital receivers 5, 37–40 installed within the housing of relays 4, 32–35. The command may include an address of the desired relay and an instruction to enable or disable the function associated with that relay. Alternatively, the command may include the address of a plurality of desired relays, and instructions to enable and/or disable the functions associated with those relays. Here, the address or identity of the desired relay(s) may be in the form of a digital (e.g., binary) address on a carrier wave, or a distinct communication frequency for each slave, or a combination of the two. Once the desired one(s) of the receivers 36–40 hears its address, it will follow the instruction to either open or close the associated relay 4, 32–35 in order to disable or enable the function. Preferably, the relays are normally-closed relays, allowing the command simply to contain the identity of the desired slave relay. In this case, the slave relay's receiver will cause the slave relay to switch states between open and closed whenever it hears its address. The receiver 5, 37–40 may also include an automatic timer which re-enables the function after a predetermined period of time.

In the preferred embodiment shown in FIGS. 4(*a*) and 4(*b*), the main receiver 1 and digital radio transmitter 3 are installed on a single platform 20, with the controller 2 being integrated into the main receiver 1, the transmitter 3 or the platform 20. Appropriate wired connections join them to each other, and a suitable cover (not shown) encapsulates the components and shields them from damage and from view. Covers are not shown in any of FIGS. 4(*a*)–4(*f*), but they are preferably provided, and are preferably formed with the same cosmetic appearance as the relays that pre-exist in the vehicle. In this manner, the devices will appear to be standard devices, thus making the system difficult to locate or detect.

The components 1, 2, 3 could also be integrated into a single printed circuit card. Together, these components form the master relay control unit 22 that is small in size, on the order of a few inches or smaller, making it easy to install out of sight. It may include three electrical connectors 24 arranged at right angles to one another in the manner arranged on prior art relay units. Using this arrangement, the master relay control unit 22 can be connected to receive power and ground from a plug installed in the vehicle. It also may be plugged into a pre-existing relay plug in the vehicle, in which case an electromagnetic relay 23 should be included within the unit 22. The relay 23 could be made permanently open or closed in order to enable whatever function is associated with that relay. Alternatively, the relay 23 could be controllable by the master relay control unit, thus making the master relay control unit act as both the master and a slave. By using a pre-existing relay plug, the main relay control unit 25 becomes even more difficult to detect. Other physical designs for the master control unit 25 are also possible since its appearance is not critical to its operation. Preferably, however, the master control unit 25 is installed in a place in the vehicle where it is not easily detected.

As to the appearance of the slave units, they too are preferably designed to look like the pre-existing relays. In order to reduce the number of slave and pre-existing relay units in the vehicle, it is also possible to incorporate two relays into the slave unit, one which acts like the pre-existing relay and another as the controllable slave relay. Such a design, however, results in a bulky slave unit.

The transmitter 3 is preferably a 300 MHZ transmitter which has sufficient range to be in radio communication with the digital radio receivers placed throughout the automobile. Similarly, the digital radio receivers 5, 37–40 and relays 4, 32–35 are designed as slave units 25 to the master relay control unit 22, as shown in FIGS. 4(*c*) and 4(*d*). Using receiver 5 and relay 4 as an example, the digital radio receiver 5, which is preferably a 300 MHz receiver, is incorporated in the relay slave unit 25 together with the relay 4. The receiver 5 and relay 4 are preferably mounted on a single relay platform 26 which operates a particular vehicle function, such as the starter motor. Plugs 24 are also present to permit the unit 25 to be connected into the appropriate relay plug in the vehicle.

In an alternative embodiment shown in FIGS. 4(*e*) and 4(*f*), the present system can function through the use of a stand alone pager-type main receiver 1 installed on a particular relay platform 28 which operates a particular vehicle function, for example the starter motor. In this configuration, the stand alone main receiver 1 includes the pager receiver which receives the signal from the main transmitter 15 of a paging dispatch center in a manner already explained, but rather than transmitting a command to a slave unit, the stand alone main receiver 28 houses the relay 27 on the relay platform 26. In this auxiliary embodiment, the main receiver is necessarily plugged into the relay plug associated with the vehicle function being controlled. It is possible to omit the in-vehicle transmitter 3 because the main receiver 1 includes controller 2 (not shown) to perform the functions that otherwise would be performed by one of the slave units. In other words, the embodiment of FIGS. 4(*e*) and 4(*f*) houses both a relay which replaces the vehicle's pre-existing relay, and the slave relay or switch explained in relation to FIGS. 2(*a*) through 2(*d*). The transmitter-free embodiment shown in FIGS. 4(*e*) and 4(*f*) is useful when only one function in the vehicle is to be enabled/disabled, but it is also possible to mount several of such stand alone units in the vehicle in order to control several functions, in which case a respective identifier would be used for each stand alone unit and all stand alone units would listen to the messages transmitted from the paging transmitter 15.

Preferably, however, the transmitter 3 is used in the stand alone main units. In this embodiment, the stand alone main unit itself controls one of the vehicle's functions and, for all other functions, it transmits commands to the slave units that are associated with those functions.

Each of the embodiments shown in FIGS. 4(a)–4(f) allow for easy installation of the present invention because most slave units will simply be plugged into pre-existing or specially installed plugs; the same is true for the stand alone main unit. The master relay control unit can likewise be fitted into an existing relay plug, or into a specially added relay plug, or it can be designed in a completely different way. What is important is that the present invention is extremely versatile in allowing its components to be hidden from detection.

Figure 5:
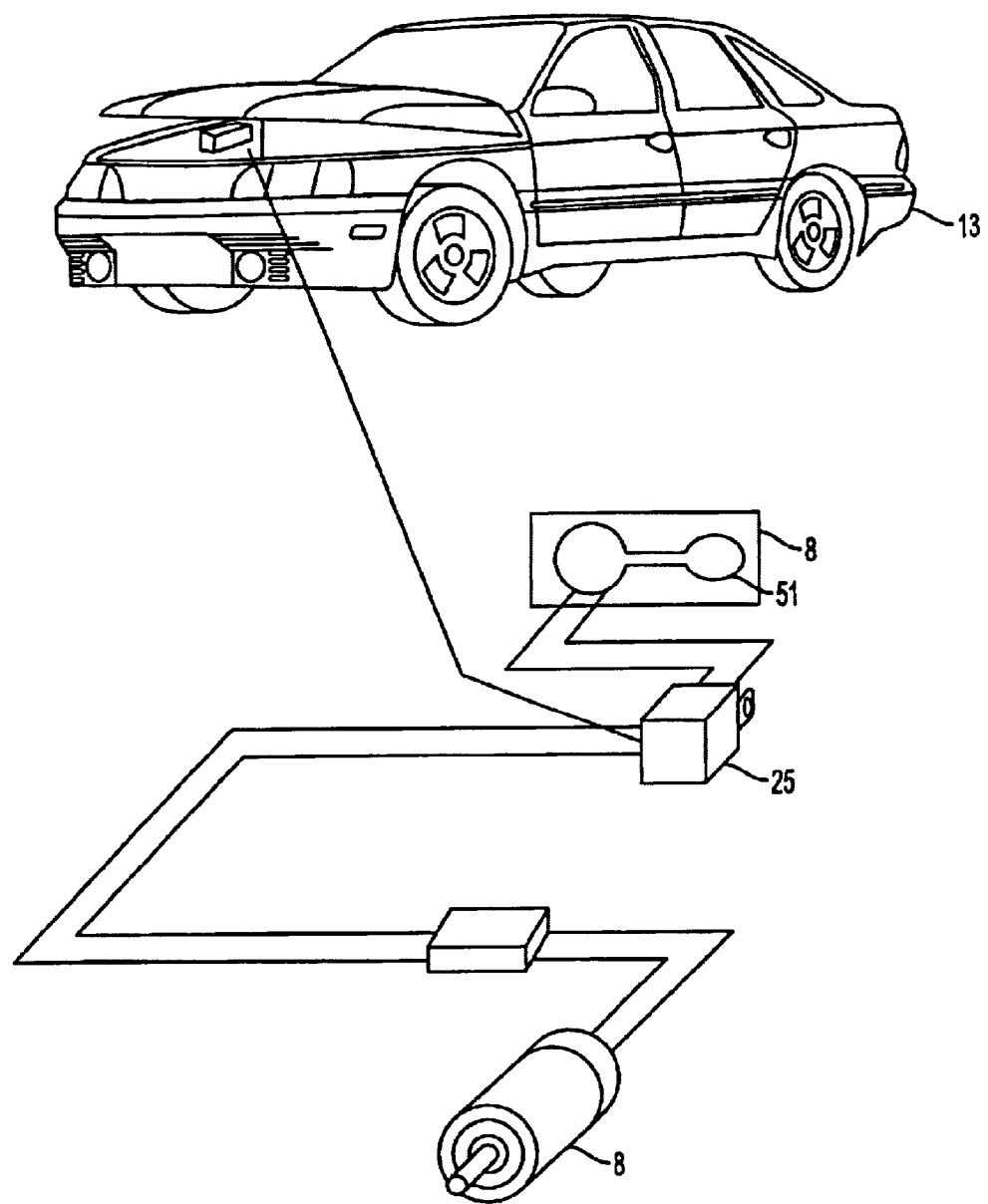
FIG. 5 shows a diagram of a vehicle starter system usable with the present invention.

As stated earlier, vehicles are typically manufactured to contain relays, such as a relay in the starter system. Because the master and/or slave relay units of the present invention can be manufactured as individual replacement relays for the vehicle's factory installed relays, or as specially installed relay units, it is possible to make their visual appearance identical or nearly identical to that of the factory installed relays. For example, as shown in FIG. 5, the vehicle 13 typically includes an ignition switch 8 which is operated by a key 51. Electrical wires are connected from the ignition switch 8 to a relay which, in the case of FIG. 5, is substituted by an inventive slave relay unit 25 containing both the pre-existing relay for the starter system and the slave relay or switch. Additional wires lead from the slave relay unit 25 to a starter solenoid 6 and to the starter motor 8. By employing the present invention, the user of the vehicle 13 remains unaware that the slave relay unit 25 is not the factory installed relay, but rather a "smart" relay which is controlled by an in-vehicle transmitter and can disable and enable the starter at will. When the salve relay unit 25 receives a command with its specific numeric address, it opens the relay and disables the starter motor's electrical circuit. The starter motor 8 will not engage the next time the driver attempts to start the car. This method of disabling the car is advantageous and safer because the vehicle is not stopped on the highway at high speeds, but rather will become disabled once the engine is turned off. It should be understood that the meaning of "disabling" and "enabling" a function in the vehicle depends on the point of view. For example, turning something "off" may be considered disabling that function, and can also be interpreted as enabling a "lockout" state. Therefore, the context of the function might influence whether it is being disabled or enabled.

Figure 6C:
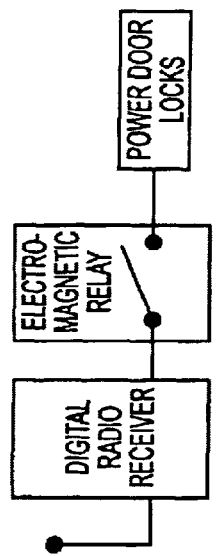
FIGS. 6(a) through 6(e) show the connection of certain slave units within a circuit according to an embodiment of the present invention.
Figure 6D:
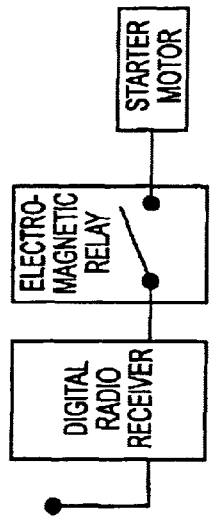
Figure 6E:
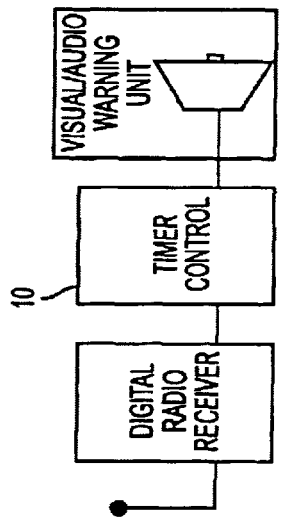
Figure 6A:
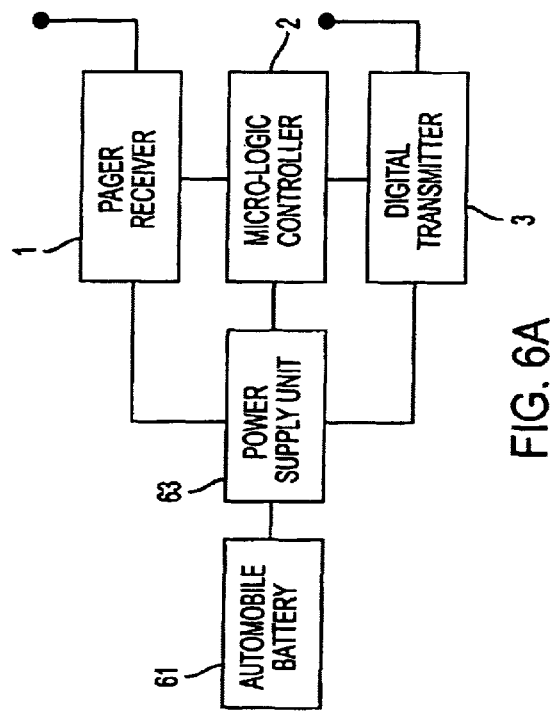

FIG. 6(a) illustrates a block diagram of certain connections in the present invention. The main receiver 1, the controller 2, and the transmitter 3, all of which are mounted somewhere in the vehicle and preferably as a main relay control unit 22, are powered by the power source battery 61 of the vehicle. The vehicle's battery may supply an inconsistent voltage, so a power-conditioning circuit 63 may be needed. Because of the possibility of the battery 61 being disconnected in an effort to circumvent the present invention, auxiliary power sources may be used, such as backup batteries (not shown) housed within or near the receiver 1, controller 2, and transmitter 3. Capacitors (not shown) may also be used to store energy in the event that main power is disconnected. It is also preferable to connect the main relay control unit and the slave units to common ground.

Figure 6B:
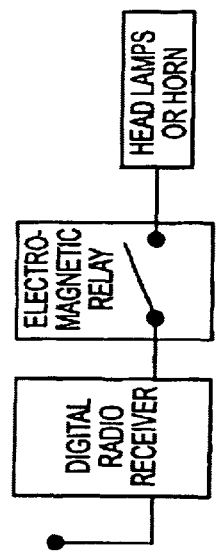

In FIGS. 6(b)–6(d), block diagrams of the individual slave relay units 25 are shown. Each unit 25 is capable of receiving the commands transmitted from the wireless transmitter 3, interpreting those commands, and deciding whether to open or close their associated electromagnetic relays. The receiver on the unit 25 determines whether the incoming command identifies that relay by address and, if so, uses the slave relay or switch (not shown) either to pass a voltage signal from the vehicle's power source to the associated pre-existing relay in order to close the relay, or to stop passage of the voltage signal in order to open the pre-existing relay. By opening a relay, the headlamp, horn, power door locks, starter, etc., is disabled. In FIG. 6(e), a timer controller 10 decides when to start and stop the audio and/or visual warning unit, and also decides what type of audio and/or visual warning to broadcast.

In operation, the present system can be utilized for a number of purposes. For example, it can be used by a lending institution 19 (FIG. 1) to ensure that the borrower keeps current on his payments to the lending company. For example, if the borrower becomes behind in his payments, the lender can, through the transmission of the appropriate signal to the vehicle, initiate the warning sequence in the vehicle. If the borrower does not take the necessary actions to satisfy his account, the lender 19 can later transmit a signal to disable the starter of the automobile. In this manner, while the car itself will not be disabled if it is already running, the car can be prevented from restarting after the engine has been turned off. Once the borrower's account is brought current, the system of the present invention can be used to re-enable the starter system. In this case, the lender 19 can either directly control the paging system 15 which transmits the warning and disable signals or, as shown in FIG. 1, the lender 19 can be in communication through ISDN, dedicated lines, or whatever type of communication is most convenient, with a separate entity such as the National Dispatch Center (NDC) 16 which transmits such signals using a proprietary nationwide communication network and a nationwide paging service provider. The dispatch center 16 preferably has access to a customer database 18 in order to know which vehicle to communicate with. The use of a paging system is advantageous because it allows transmission of the signals to all geographical regions where the vehicle may be, simultaneously. It would be very difficult for a user to successfully escape the geographical reaches of the lender 19.

Still further, the present system can be utilized by automobile associations or rental companies to automatically unlock the vehicle doors and/or trunk from a remote location upon receiving information that the owner or renter has locked the keys in the car. Still another use of the present invention is with law enforcement. Cars can be immobilized by disabling the starter or the ignition system, meaning that drivers convicted of automobile violations such as driving under the influence can be prevented from using their cars altogether by simply installing the present invention. Drivers can also be prevented from using their cars during certain hours of the day by disabling it at certain times and re-enabling it at others. The re-enablement can be done by subsequently transmitted signals, or by using an automatic timer within the controller 2 or within the receiver 5, 32–35.

As those skilled in the art will appreciate, using the foregoing combination of components, a system can be easily installed within an automobile by simply replacing stock relays with specialized relays as described above. In this manner, the entire system is a wireless type system and does not require the direct electrical connection of the main receiver with the particular components through the automobile. As those skilled in the art will appreciate, this will result in a much more cost effective product in terms of component costs and installation.

The invention having been thus described, it will be obvious that the same may be varied in many ways. For example, the relays or switches used in the slave units can be temporary on/off switches, such as relays, or permanent on/off switches such as fuses. Such variations are not to be regarded as a departure from the spirit and scope of the invention, but rather as modifications intended to be encompassed within the scope of the following claims.

What is claimed is:

1. An apparatus for disabling at least one function in a vehicle, said apparatus being mounted in the vehicle and comprising:
   a receiver for receiving a remote signal;
   a controller, connected to said receiver, the controller structured to interpret the remote signal from many possible remote signals, with each remote signal representing instructions for disabling at least one function in the vehicle, the controller instructing a transmission of a command to disable the function in the vehicle that corresponds to the received remote signal;
   a wireless transmitter, connected to said controller, for transmitting the command; and
   at least one switching device, said switching device including:
      a switch for disabling the function of the vehicle, and
      a second receiver, said second receiver for receiving the command transmitted by said wireless transmitter and for controlling said switch in order to disable the function.

2. The apparatus according to claim 1, wherein said second receiver includes an antenna for detecting the command transmitted by said wireless transmitter, and a second controller, connected to said antenna and responsive to said command, for controlling said switch in order to disable the function.

3. The apparatus according to claim 1, wherein said predetermined signal includes an identification of the vehicle.

4. The apparatus according to claim 3, wherein said predetermined signal further includes a command for disabling a specific function of the vehicle.

5. The apparatus according to claim 1, wherein the vehicle includes a starter, and said switch is for disabling the starter.

6. The apparatus according to claim 1, wherein, based upon a subsequent remote signal, said controller instructs transmission of a command to re-enable the function in the vehicle.

7. The apparatus according to claim 1, further comprising a plurality of said switching devices, each switching device being operatively connected so as to enable and/or disable a respective function in the vehicle, and further wherein said command identifies at least one of said plurality of switching devices.

8. The apparatus according to claim 1, wherein the function is at least one of: disabling a starter motor of the vehicle; disabling an ignition system of the engine; disabling door locks; disabling head lamps; and disabling access to a storage compartment.

9. The apparatus according to claim 1, wherein the vehicle includes a relay device unassociated with said apparatus, and said switching device is substantially identical in appearance to the relay device so as to inhibit detection of said switching device.

10. An apparatus for enabling and/or disabling at least one function in a vehicle, said apparatus being mounted in the vehicle and comprising:
    a receiver for receiving a remote signal;
    a controller, connected to said receiver, the controller structured to interpret the remote signal from many possible remote signals, with each remote signal representing instructions for disabling at least one function in the vehicle, the controller instructing a transmission of a command to enable or disable the function in the vehicle that corresponds to the received remote signal;
    a wireless transmitter, connected to said controller, for transmitting the predetermined command; and at least one switching device, said switching device including:
       a switch for enabling or disabling the function of the vehicle, and
       a second receiver, said second receiver for receiving the command transmitted by said wireless transmitter and for controlling said switch relay in order to enable or disable the function.

11. The apparatus according to claim 10, wherein said second receiver includes an antenna for detecting the command transmitted by said wireless transmitter, and a second controller connected to said antenna and responsive to the command, for controlling said switch in order to enable or disable the function.

12. The apparatus according to claim 10, wherein said predetermined signal includes an identification of the vehicle.

13. The apparatus according to claim 12, wherein said predetermined signal further identifies a function of the vehicle and whether the function is to be enabled or disabled.

14. The apparatus according to claim 10, wherein the vehicle includes a starter, and said switch is for enabling and disabling the starter.

15. The apparatus according to claim 10, wherein, based upon said remote signal, said controller instructs transmission of a command to enable and/or disable a plurality of functions in the vehicle.

16. The apparatus according to claim 10, wherein the function is at least one of: disabling a starter motor of the vehicle; disabling an ignition system of the engine; disabling door locks; disabling headlamps; disabling access to a storage compartment; and enabling a sound device.

17. The apparatus according to claim 10, wherein the vehicle includes a relay device unassociated with said apparatus, and said switching device is substantially identical in appearance to the relay device so as to inhibit detection of said switching device.

18. The apparatus of claim 1 wherein:
    the switch is structured as a smart relay adaptable to be used with a preexisting vehicle relay; and
    the smart relay controls a state of an associated vehicle function independently of the state of the preexisting vehicle relay.

19. The apparatus of claim 1 further comprising a central remote control station located outside of the vehicle, which is not mounted to the vehicle, the station being structured to structured to:
    send the remote signal to the receivers; and
    send a plurality of additional remote signals to a plurality of additional vehicles.

20. A method for disabling at least one function in a vehicle, comprising:
    receiving a remote signal at the vehicle, the remote signal being one of many possible remote signals, with each remote signal representing an instruction for enabling or disabling at least one vehicle function;
    determining which vehicle function to enable or disable, based on which remote signal was received;
    transmitting a wireless command from the vehicle to enable or disable the vehicle function;

receiving said wireless command in the vehicle; and enabling or disabling the vehicle function in response to receipt of said wireless command.

21. A system for communicating in a wireless manner, the system comprising:

a vehicle;

a remote receiver system connected to the vehicle, the remote receiver assembly being strutured to receive a remote signal at the vehicle, the remote signal being one of many possible remote signals, with each remote signal representing an instruction for enabling or disabling at least one vehicle function; and a local receiver assembly connected to the vehicle, The local receiver assembly being structured to receive a local wireless signal from the remote receiver, the local wireless signal representing an instruction for enabling or disabling at least one vehicle function.

22. The system of claim 21 wherein the remote receiver assembly is structured to send the local wireless signal in response to the remote wireless signal.

23. The system of claim 21 wherein the local receiver assembly is structured to control a function of a vehicle in response to the local wireless signal.

24. The system of claim 23 wherein the local receiver assembly is structured to disable a function of a vehicle in response to the local wireless signal.

25. The system of claim 24 wherein the local receiver assembly is structured to enable a function of a vehicle in response to the local wireless signal.

26. The system of claim 24 wherein the local receiver assembly is structured to adjust a function of a vehicle in response to the local wireless signal.

27. The system of claim 21 wherein the local receiver assembly comprises a smart relay assembly comprising:

a first relay structured to control a function of the vehicle;

a vehicular relay controller structured to control operation of the relay during normal operation of the vehicle; and a smart controller structured to structured to override the vehicular relay controller and to thereby control the first relay in response to receipt of the appropriate command by the smart relay controller.

* * * * *